UNITED STATES PATENT OFFICE.

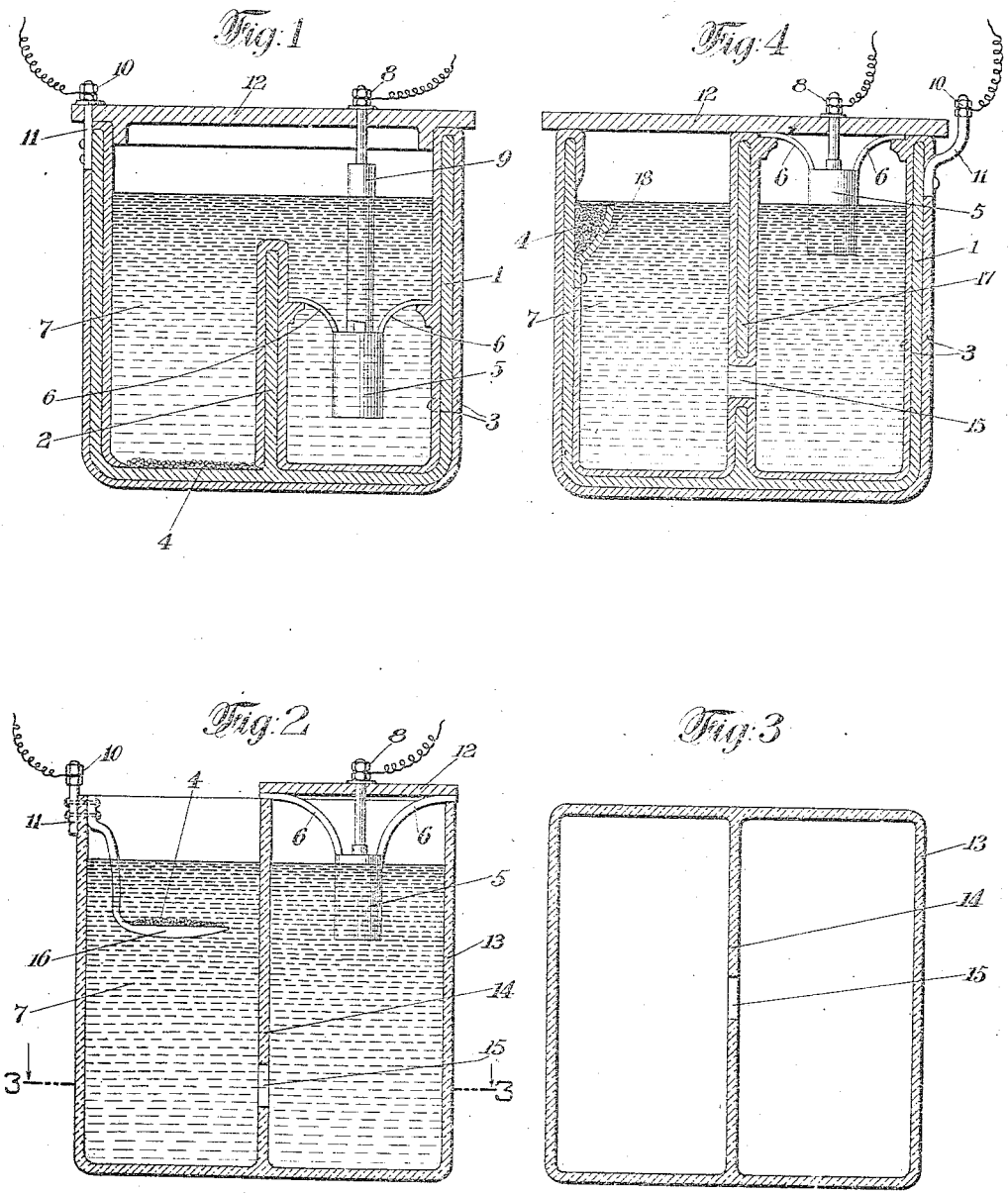

SAMUEL M. WARD, JR., OF NEW YORK, N. Y., ASSIGNOR, BY MESNE ASSIGNMENTS, TO HALL SWITCH & SIGNAL COMPANY, OF NEW YORK, N. Y., A CORPORATION OF MAINE.

GALVANIC CELL.

1,145,950.

Specification of Letters Patent.  Patented July 13, 1915.

Application filed September 30, 1911. Serial No. 652,130.

*To all whom it may concern:*

Be it known that I, SAMUEL M. WARD, Jr., a citizen of the United States, residing in the borough of Manhattan, city of New York, in the county of New York and State of New York, have invented certain new and useful Improvements in Galvanic Cells, of which the following is a specification, reference being had therein to the accompanying drawings, forming part thereof.

My invention relates to galvanic cells, and particularly to wet cells.

One of the objects of my invention is to produce a cell of high internal resistance suitable for use in track batteries in railway signaling systems and for similar uses wherein a high internal resistance cell is desirable.

Another object of my invention is to increase the efficiency and the life of galvanic cells by so constructing the cells as to preclude the possibility of intimate contact between disintegrated or comminuted particles of opposite electrodes which weakens the cell and shortens its life.

Other objects of my invention are simplicity and economy of construction and maintenance, and durability and reliability of operation.

Still other objects and advantages of my invention will appear from the following description.

In the preferred form of my invention, the containing jar is composed of electro-negative material and is coated with an insulating material on its entire inside surface with the exception of one portion, which serves as the negative electrode, and a partition is disposed between this exposed portion and the positive electrode. More specifically, this exposed portion of the inner face of the jar is covered with a suitable depolarizer, such as copper oxid. Still more specifically, the electrolyte is of low resistance.

My invention also includes various other features, as will appear from the following description.

I shall now describe the embodiments of my invention illustrated in the accompanying drawings and shall thereafter point out my invention in claims.

Figure 1 is a vertical sectional elevation of a cell embodying my invention. Fig. 2 is a similar view showing a modified construction. Fig. 3 is a horizontal section of the cell shown in Fig. 2 taken on line 3—3, looking down. Fig. 4 is a view similar to Fig. 1, showing another modified construction.

In various uses to which galvanic cells are put, the external circuit is frequently shunted and the cells are practically short circuited. Among such uses are railway signaling systems in which the track batteries are short-circuited by the wheels and axles of a train passing over the track at the points at which the batteries are connected, with the result that the batteries needlessly use themselves up. Means embodying my invention obviate this difficulty by rendering the cell of high internal resistance, and such a cell has the advantage of keeping itself warm in cold weather by the heat generated in overcoming the internal resistance, an advantage which is not realized by interposing an artificial resistance externally of the battery.

In the specific embodiment of my invention which is illustrated in Fig. 1, the containing jar 1 is composed of electro-negative material, preferably heavy pressed steel, which is provided with a central transverse partition 2, preferably integral with the sides and bottom of the jar, and of a height somewhat less than that of the jar. This partition serves to divide the jar preferably into two substantially equal compartments, and communication between the two is confined to a path over the top of the partition 2. The entire surface of the jar, both inside and outside, is glazed or coated with an insulating compound 3, such as enamel, with the exception of the bottom of the compartment at the left of the partition 2. This exposed bottom, therefore, serves as a negative electrode, and a mass of depolarizing material 4, such as copper oxid, is spread over this exposed bottom. This compartment I, therefore, term the negative electrode compartment, while in the other compartment, which I term the positive electrode compartment, is suspended a suitable positive electrode 5, preferably zinc, which is supported well down toward the bottom of the compartment, upon radially extending arms 6 which rest upon suitable projections on the inner face of the compartment. The electrolyte 7 is preferably a low resistance electrolyte, composed of an alkaline hydrate, such as sodium hydrate or potassium hydrate, and a sufficient amount of electrolyte is employed to cover the top of the partition 2. A suitable binding post 8 is provided on the end of the zinc terminal, the stem of which is covered with an insulation 9 where it is submerged in the electrolyte in order to prevent direct electrical communication between the stem and the positive electrode. A binding post 10 for the negative terminal is provided on a lip 11, which is riveted or otherwise secured to the top of the jar 1, the enamel being broken away at this point to permit electrical connection between the lip and the jar. A suitable cover 12 may be provided for the jar.

The current is conducted from the exposed portion of the jar through the walls of the jar and the binding post 10, and thence through the outside circuit back to the binding post 8. It will be noted that the path of the current in the cell is necessarily over the top of the partition 2, and by reason of this circuitous path the internal resistance in the cell is rendered high without any of the accompanying disadvantages of a high resistance electrolyte. It is manifest that this internal resistance can be varied by the use of more or less electrolyte, thus varying the depth of the electrolyte above the top of the partition 2, and in this way varying the cross-section of the electrolyte through which the current must pass at the restricted communication provided between the two communicating chambers of the jar. It will also be noted that with this construction any particles of the zinc electrode, which may become disintegrated, fall by gravity to the bottom of the positive electrode compartment, and cannot reach the negative electrode and needlessly use up the cell, as would be the result, for instance, if the positive electrode were disposed directly above the negative electrode. In this way direct communication between the two electrodes is prevented, and intimate contact between disintegrated particles of the electrodes is prevented.

It will be manifest that the jar illustrated in Fig. 1 is of a highly advantageous construction, in that it serves as one of the electrodes, and being very strong can undergo the rough treatment to which battery jars in railway signaling service are subjected, and will stand all extremes of temperature without breakage. It will readily be understood, however, that my invention is not limited to a jar which is composed of conductive material, and in Figs. 2 and 3, I have illustrated an embodiment of my invention in which the jar 13 is of porcelain or glass and the central partition 14 is integral therewith. This partition extends to the top of the jar, and a restricted communication between the two compartments is provided by an opening 15 somewhat above the bottom of the partition. The positive electrode 5 is supported from the top of the jar in the top of the electrolyte 7, and a negative compartment 16 is supported in the opposite side in the top of the electrolyte, and hence direct communication between the two electrodes is prevented since the current must take the circuitous path through the opening 15.

The disintegrated particles of the positive electrode 5 fall by gravity to the bottom of the positive electrode compartment, and since the opening 15 is disposed some distance above the bottom of the jar, the disintegrated particles are prevented from getting in the negative electrode compartment and acting directly upon the negative electrode and thus needlessly using up the cell.

It will be apparent that in the construction shown in Fig. 1, since the internal resistance is dependent upon the cross-section of electrolyte above the partition 2, evaporization may tend to increase the internal resistance, although, if the cell is properly sealed, evaporization may be made negligible. It will also be apparent that in Fig. 2, since the restricted communication between the two compartments is well below the top of the electrolyte, the internal resistance of this cell is not affected by evaporization. In Fig. 4 I have shown a construction which combines the advantages of the two constructions, and which includes the full length of the walls in the internal circuit. In this construction, the walls are of an electro-negative material coated with an insulating compound, as described in reference to Fig. 1. Instead of the partition 2, however, a partition 17 is employed, which extends to the top of the jar, and is provided with an opening 15 similar to the construction shown in Figs. 2 and 3. The zinc electrode 5 is supported at the top of the positive electrode compartment, and to form the negative electrode the insulating compound is removed from a portion of the inner face of the negative electrode compartment near the top thereof, and the two electrodes are submerged in the electrolyte 7. To retain the depolarizing compound 4 in contact with the negative electrode, a pocket 18 of insulating material is formed in front of the negative electrode, and the depolarizing material is placed in this pocket. It is apparent that the current flows through the electrolyte in the circuitous path between the two electrodes through the opening 15, as described in reference to Fig. 2, and the lip 11 is attached to the outer wall of the negative electrode compartment, thereby causing the current to traverse the full length of the metallic walls of the jar from the positive electrode to the lip 11 and binding post 10. This jar, therefore, is not affected by evaporization and has the advantages which flow from a metallic jar.

It is obvious that various modifications may be made in the constructions shown and above particularly described within the principle and scope of my invention.

I claim:

1. A galvanic cell comprising a suitable electrolyte, a containing jar of electro-negative material having a portion of the inner face thereof exposed and the rest of the inner face insulated from the electrolyte, a positive electrode suitably supported in the electrolyte, and an impervious wall projecting from the inner face of the jar into the electrolyte arranged to prevent direct communication between the positive electrode and the exposed face of the jar.

2. A galvanic cell comprising a suitable electrolyte, a containing jar of electro-negative material having a portion of the inner face thereof exposed and the rest of the inner face insulated from the electrolyte, a positive electrode suitably supported in the electrolyte, an impervious wall projecting from the inner face of the jar into the electrolyte arranged to prevent direct communication between the positive electrode and the exposed face of the jar, and a suitable depolarizer on the exposed portion of the inner face of the jar.

3. A galvanic cell comprising a suitable electrolyte, a containing jar of electro-negative material having a portion of its inner bottom face exposed and the rest of its inside insulated from the electrolyte, a positive electrode supported in the electrolyte over the insulated portion of the bottom of the jar, and an insulating wall projecting from the bottom of the jar into the electrolyte separating the insulated and exposed portions of the bottom of the jar.

4. A galvanic cell comprising a suitable electrolyte, a containing jar of electro-negative material having a portion of its inner bottom face exposed and the rest of its inside insulated from the electrolyte, a mass of depolarizing material spread on the exposed bottom, a positive electrode supported in the electrolyte over the insulated portion of the bottom of the jar, and a wall projecting from the bottom of the jar into the electrolyte and separating the insulated and exposed portions of the bottom of the jar.

5. A galvanic cell comprising a suitable electrolyte, a containing jar of electro-negative material having a dividing wall extending up from the bottom into the electrolyte, the bottom on one side of the dividing wall being exposed and the rest of the inside of the jar being insulated from the electrolyte, a mass of suitable copper compound spread on the exposed portion of the bottom, and a zinc electrode supported in the electrolyte on the opposite side of the dividing wall.

6. A galvanic cell comprising an electrolyte of a hydroxid of an alkali, a containing jar of steel having a partition therein extending up from the bottom into the electrolyte and forming two compartments, the bottom of the one compartment being exposed and the rest of the inside of the jar being coated with insulating material, a mass of copper oxid disposed on the exposed bottom of the one compartment, a zinc electrode suitably supported in the other compartment, and suitable binding posts, one connected to the zinc terminal and the other to the jar.

7. A galvanic cell comprising a metallic containing jar having a partition extending upward from the bottom of the cell and terminating below the top of the jar and dividing it into two compartments, the interior of one of said compartments being covered with an insulating material and the other compartment being covered with an insulating material except at its bottom, said partition being constructed so as to prevent the flow of current therethrough, and a liquid electrolyte in said jar extending above the partition and providing a restricted communicating cross-sectional area between the two compartments.

8. A galvanic cell comprising a suitable electrolyte, a containing jar of electro-negative material having a portion of its inner face exposed to and the rest of the inner face insulated from the electrolyte, a positive electrode suitably supported in the electrolyte, an impervious wall projecting up from the bottom of the jar into the electrolyte between the positive electrode and the negative electrode, so as to prevent disintegrated particles of the positive electrode from traveling to the negative electrode.

In testimony whereof I have affixed my signature in presence of two witnesses.

SAMUEL M. WARD, Jr.

Witnesses:
 AIMÉE L. VINCENT,
 EDWIN SEGER.